US010904019B2

(12) United States Patent
Wang

(10) Patent No.: US 10,904,019 B2
(45) Date of Patent: Jan. 26, 2021

(54) COMMUNICATION NETWORK POWER SUPPLY CONTROL METHOD AND APPARATUS

(71) Applicant: ZTE CORPORATION, Guangdong (CN)

(72) Inventor: Honglai Wang, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 267 days.

(21) Appl. No.: 15/998,969

(22) PCT Filed: Feb. 17, 2017

(86) PCT No.: PCT/CN2017/073906
§ 371 (c)(1),
(2) Date: Aug. 17, 2018

(87) PCT Pub. No.: WO2017/140257
PCT Pub. Date: Aug. 24, 2017

(65) Prior Publication Data
US 2020/0235948 A1 Jul. 23, 2020

(30) Foreign Application Priority Data
Feb. 17, 2016 (CN) .......................... 2016 1 0089415

(51) Int. Cl.
*H04L 12/10* (2006.01)
*G05F 1/56* (2006.01)
(Continued)

(52) U.S. Cl.
CPC .............. *H04L 12/10* (2013.01); *G05F 1/562* (2013.01); *H02M 7/10* (2013.01); *H02M 2001/007* (2013.01)

(58) Field of Classification Search
CPC .......... H04L 12/10; G05F 1/562; H02M 7/10; H02M 2001/007
See application file for complete search history.

(56) References Cited

U.S. PATENT DOCUMENTS 9,923,727 B2 * 3/2018 Rimboim ................ H04L 12/10
2005/0085212 A1 4/2005 Peker et al.
(Continued)

FOREIGN PATENT DOCUMENTS

CN 2805211 Y 8/2006
CN 102801535 A 11/2012
(Continued)

OTHER PUBLICATIONS

International Search Report and Written Opinion for International Appl. No. PCT/CN2017/073906 dated Apr. 12, 2017.
(Continued)

Primary Examiner — Jared Fureman
Assistant Examiner — Duc M Pham
(74) Attorney, Agent, or Firm — Foley & Lardner LLP

(57) ABSTRACT

A communication network power supply method and apparatus. The method comprises: before supplying power to an electric load, at least two paths of input voltages being connected in series; and according to the rated power of the electric load, performing isolation transformation processing on the input voltages connected in series, so as to obtain a voltage required by the electric load.

8 Claims, 4 Drawing Sheets

(51) Int. Cl.
*H02M 7/10* (2006.01)
*H02M 1/00* (2006.01)

(56) References Cited

U.S. PATENT DOCUMENTS

| | | |
|---|---|---|
| 2005/0184680 A1* | 8/2005 | Mayer ................ H05B 41/2983 315/266 |
| 2005/0197094 A1 | 9/2005 | Darshan et al. |
| 2008/0231116 A1 | 9/2008 | Keenly et al. |
| 2012/0242168 A1 | 9/2012 | Tsai et al. |
| 2014/0084691 A1* | 3/2014 | Ranzato ................... H02J 1/00 307/60 |

FOREIGN PATENT DOCUMENTS

| | | |
|---|---|---|
| CN | 102938699 A | 2/2013 |
| CN | 203086494 U | 7/2013 |
| CN | 104243175 A | 12/2014 |

OTHER PUBLICATIONS

Extended European Search Report for EP Appl. No. 17752689.4, dated Aug. 1, 2019.

\* cited by examiner

COMMUNICATION NETWORK POWER SUPPLY CONTROL METHOD AND APPARATUS

CROSS-REFERENCE TO RELATED APPLICATIONS

This is a National Stage Application, filed under 35 U.S.C. 371 of International Patent Application No. PCT/CN2017/073906, filed on Feb. 17, 2017, which claims priority to Chinese Patent Application No. 201610089415.X filed on Feb. 17, 2016, the contents of both of which are incorporated herein by reference in their entireties.

TECHNICAL FIELD

The present disclosure relates to the field of power-supplying of a communication network, for example, to a method and an apparatus for controlling power-supplying of a communication network.

BACKGROUND

With continuous development of communication network technologies, the communication network, which is used to propagate information flow, can also be used to propagate current to supply power to electrical equipment within the communication network. For example, Ethernet may be used to supply power to electronic equipment in the network such as network phones, wireless access points, surveillance cameras, and terminal switching equipment. Also, for example, a telephone network may be used to supply power to electronic equipment in the telephone network such as telephones, long-lights, and environmental monitoring equipment. The communication network is used to supply power to the network devices, which solves problem of difficulty in power acquisition, improves flexibility of use of the equipment, reduces installation complexity and use cost of the equipment itself, and also the communication network may be used to remotely control power-supplying or power off of the equipment. In supplying power by the communication network, an interface control module usually needs to be provided between a power supplying end and an electric load in order to control whether to receive current from the power supplying end, or whether to transmit current to the electric load located in lower-level. The communication network may be a power supply network that can provide direct current, such as Ethernet or a telephone network. The power supplying end, the interface control module, and the loads on a circuit between the power supplying end and the interface control module are collectively referred to as a power supply circuit.

With wide use of technologies for supplying power by the communication network, the electric load in the communication network has higher power utilization demand. In order to supply greater power by the communication network, two or more power supplying ends are usually used to supply power to the same electric load. To ensure fairness in the power supplying or line safety, there are two methods. In the first method, a current averaging module needs to be designed between the interface control module and the electric load. That is, after the interface control module receives the power supply of the power supplying end, it outputs power supply with the same current size via the current averaging module, and the power supply with the same current size is output to the electric load through a DC (Direct Current)/DC voltage converter. Due to the differences in power supply distance of the power supplying end and loss in a power supply line, there is a problem of large voltage difference between ports of the interface control module. The related scheme may be used to compensate for the voltage difference between the input ports by performing non-DC/DC conversion on a voltage of each input port (for example, using the manner of linear voltage conversion of Low Dropout Regulator (LDO) or series resistor for voltage division) to achieve current averaging. However, the voltage compensation range of this method is limited and the current averaging effect is poor, and also the greater voltage difference between the input ports would lead to the greater loss and the lower efficiency. The second method is to make each of the power supply lines correspond to a DC/DC voltage converter to achieve current averaging. As the number of the power supply lines increases, the number of the DC/DC voltage converters would increase, and hence the cost is also greatly increased. When power supplying time of each of the power supplying ends is different with others, powers outputted from the power supplying ends in the above two methods are not equal, thereby failing to achieve the fairness in power supplying.

SUMMARY

The embodiments of present disclosure provide a method and an apparatus for controlling power-supplying of a communication network, which can improve the efficiency and cost of the control for power-supplying of the communication network.

In an aspect, it provides a method for controlling power-supplying of a communication network, which includes:

connecting serially at least two input voltages before supplying power to an electric load; and performing isolation voltage transformation processing on the serially connected input voltages according to rated power of the electric load, to obtain a voltage required for the electric load.

In an implementation, before connecting serially the at least two input voltages, the method further includes:

determining the number of the at least two input voltages;

calculating a voltage value for a voltage transformation according to the number of the at least two input voltages and a voltage value of each of the at least two input voltages; and performing non-isolation voltage transformation processing on the each of the at least two input voltages according to the voltage value for the voltage transformation;

connecting serially the at least two the input voltages includes: connecting serially the at least two input voltages subjected to the non-isolation voltage transformation.

In an implementation, calculating the voltage value for the voltage transformation includes: determining, according to the number of the at least two input voltages, the voltage value of the each of the at least two input voltages after voltage reduction, so that the voltage value of the serially connected input voltages is kept substantially constant, regardless of the increased number of the input voltages.

In another aspect, it provides an apparatus for controlling power-supplying of a communication network, which includes a series voltage circuit having N inputs and one output, and an adjustable voltage DC/DC isolation circuit having one input and one output.

The series voltage circuit is configured to connect serially at least two input voltages before supplying power to an electric load, and output the serially connected input voltages to the adjustable voltage DC/DC isolation circuit.

The adjustable voltage DC/DC isolation circuit is configured to perform isolation voltage transformation on the serially connected input voltages according to rated power of the electric load, to obtain a voltage required for the electric load, and output to the electric load the input voltages subjected to the isolation voltage transformation, wherein the N is an integer greater than or equal to 2.

In an implementation, the apparatus further includes: a detection circuit having N inputs and N outputs, and a non-isolation voltage transformation circuit having N inputs and N outputs.

The detection circuit is configured to determine the number of the at least two input voltages, calculate a voltage value for a voltage transformation according to the number of the at least two input voltages and a voltage value of each of the at least two input voltages, and output the voltage value for the voltage transformation as a control signal to the non-isolation voltage transformation circuit.

The non-isolation voltage transformation circuit is configured to perform non-isolation voltage transformation processing on the each of the at least two input voltages according to the control signal, and output to the series voltage circuit the input voltage subjected to the non-isolation voltage transformation processing.

The series voltage circuit is configured to connect serially the at least two input voltages subjected to the non-isolation voltage transformation processing.

In an implementation, the apparatus further includes: an interface control circuit having N inputs and N outputs, wherein an output end of the interface control circuit is connected to an input end of the detection circuit and an input end of the non-isolation voltage transformation circuit, the interface control circuit is configured to filter the input voltage and control the number of the at least two input voltages.

In an implementation, the detection circuit includes N input-and-output sub-circuits, each of the input-and-output sub-circuits includes a first switch, a second switch, a resistor and a capacitor. A stationary end of the first switch is connected to a movable end of the second switch and a first end of the resistor, a second end of the resistor is connected to a first end of the capacitor, and a second end of the capacitor is connected to a stationary end of the second switch, a movable end of the first switch is connected to an anode of an input end of the detection circuit, and the stationary end of the second switch is connected to a cathode of the input end of the detection circuit, a first end of the capacitor is connected to an anode of an output end of the detection circuit, and the second end of the capacitor is connected to a cathode of the output end of the detection circuit.

In an implementation, the series voltage circuit includes N diodes connected in series, each of the diodes is connected in parallel with two input ends of one of the N inputs of the series voltage circuit, to provide a freewheeling path.

In an implementation, the adjustable voltage DC/DC isolation circuit is an adjustable low frequency transformer.

In an implementation, the apparatus is integrated on the electric load as at least one of a chip or a modular circuit.

In the embodiments of the present disclosure, adjustment volume of power supply voltage can be controlled according to the number of the input voltages and the voltage value outputted by the power supply circuit, so that the power supply system as a whole is in a high-efficiency working state, and power supplying efficiency is improved. The power supplying voltage subjected to the voltage transformation processing is connected serially, so that automatic current averaging and fairness in power supplying are realized, conversion efficiency of the current averaging is improved, the consumption of heat energy is reduced, the number of components in the power supply circuit is reduced, and the cost is reduced.

BRIEF DESCRIPTION OF THE DRAWINGS

The drawings constitute a part of the present disclosure, and description of exemplary embodiments and embodiments of the present disclosure are intended to explain the present disclosure and not to limit the disclosure.

DETAILED DESCRIPTION

In order to make the present disclosure clear, the present disclosure will be described in detail below in conjunction with the accompanying drawings and embodiments. The embodiments described herein are merely illustrative of the disclosure and are not intended to limit the disclosure. The following embodiments and features in the embodiments may be arbitrarily combined with each other without conflict.

Figure 1:
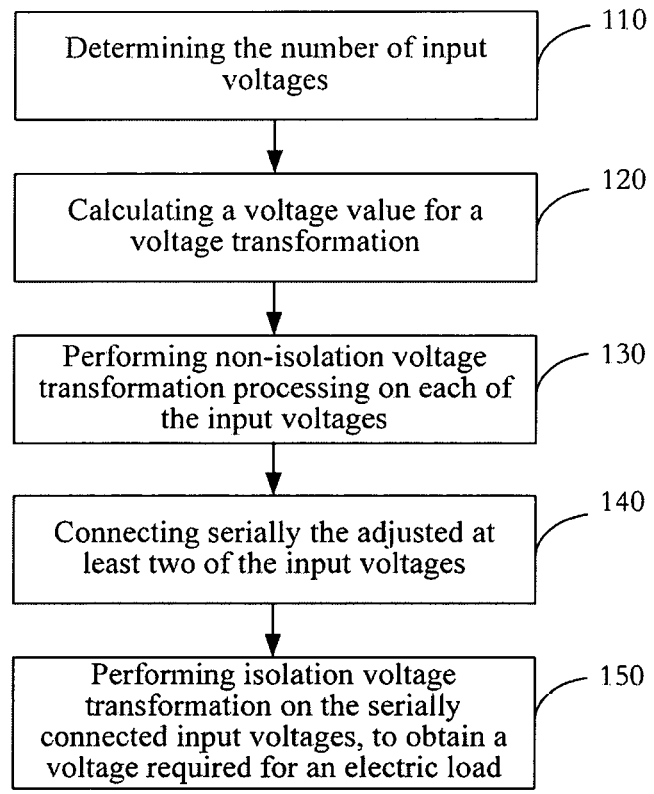
FIG. 1 is a flow chart of an alternative embodiment of a method for controlling power-supplying of a communication network according to the present disclosure.

FIG. 1 is a flow chart of an alternative embodiment of a method for controlling power-supplying of a communication network according to the present disclosure.

In step 110, the number of input voltages is determined before supplying power to an electric load.

The input voltages are output voltages of the power supply circuit.

In step 120, a voltage value for a voltage transformation is calculated according to the number of the input voltages and a voltage value of each of the input voltages. The above voltage value for the voltage transformation can be calculated as follows: the voltage value of each of the input voltages after voltage reduction can be determined according to the number of the input voltages, so that the voltage value of the serially connected input voltages is kept substantially constant, regardless of the increased number of the input voltages.

For example, if there are five input voltages, then each input voltage is transformed from 48V to 10V by non-isolation voltage transformation, and the series voltage after five voltage transformations is 50V. If there are eight input voltages, then each input voltage is transformed from 48V to 6.3V by non-isolation voltage transformation, and the series voltage after eight voltage transformations is still 50V.

In step 130, non-isolation voltage transformation processing is performed on the each of the input voltages according to the voltage value for the voltage transformation, to adjust the voltage value of each of the input voltages to the voltage value for the voltage transformation.

In step 140, the adjusted at least two input voltages are connected serially to achieve automatic current averaging.

In step 150, isolation voltage transformation is performed on the serially connected input voltages according to rated power of the electric load, to obtain a voltage required for the electric load.

In this embodiment, before the input voltages are connected serially, non-isolation voltage transformation processing is performed on the voltage value of the input voltage, thereby improving the efficiency of subsequent isolation voltage transformation.

Figure 2:
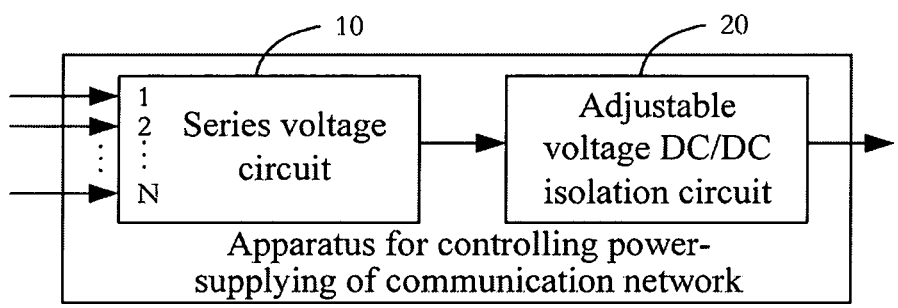
FIG. 2 is a schematic block diagram of a first embodiment of an apparatus for controlling power-supplying of the communication network according to the present disclosure.

FIG. 2 is a schematic block diagram of a first embodiment of an apparatus for controlling power-supplying of the communication network according to the present disclosure.

The apparatus for controlling power-supplying of the communication network of this embodiment includes: a series voltage circuit 10 and an adjustable voltage DC/DC isolation circuit 20.

The series voltage circuit 10 has N inputs and one output, and is configured to connect serially the input voltages before supplying power to the electric load, to obtain an input voltage which can be used for isolation voltage transformation, and output the serially connected input voltage to the adjustable voltage DC/DC isolation circuit 20.

The adjustable voltage DC/DC isolation circuit 20 has one input and one output, and is configured perform isolation voltage transformation on the serially connected input voltages according to the rated power of the electric load, and output the input voltages subjected to the isolation voltage transformation to the electric load.

The N is an integer greater than or equal to 2.

In this embodiment, all the input voltages are connected serially, which can realize automatic current averaging with simple structure, easy implementation and low cost.

Figure 3:
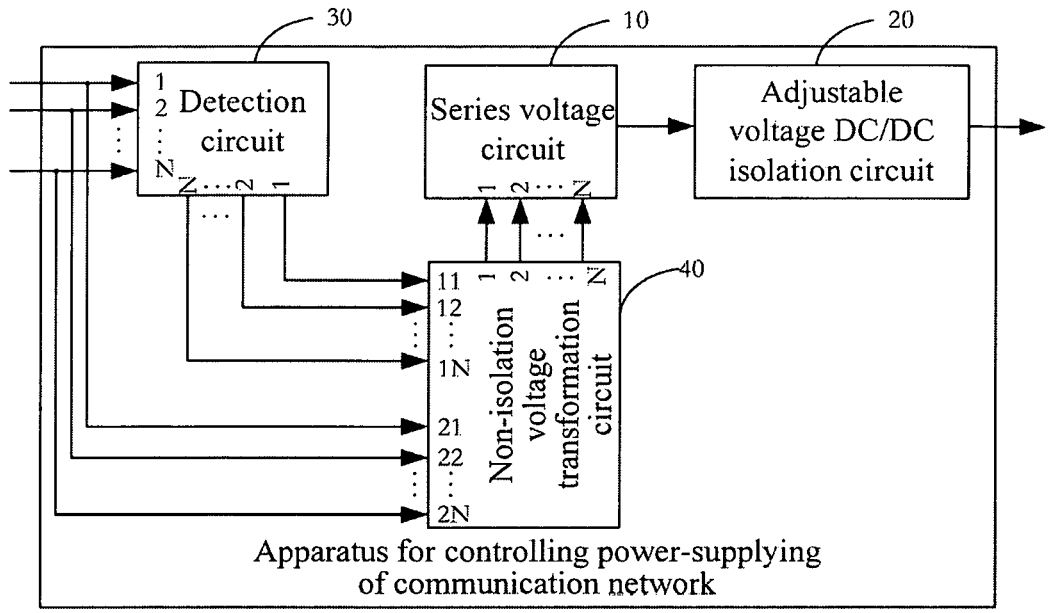
FIG. 3 is a schematic block diagram of a second embodiment of the apparatus for controlling power-supplying of the communication network according to the present disclosure.

FIG. 3 is a schematic block diagram of a second embodiment of the apparatus for controlling power-supplying of the communication network according to the present disclosure. The apparatus in this embodiment includes a series voltage circuit 10, an adjustable voltage DC/DC isolation circuit 20, a detection circuit 30, and a non-isolation voltage transformation circuit 40.

The detection circuit 30 has N inputs and N outputs, and is configured to determine the number of the input voltages, calculate the voltage value for the voltage transformation according to the number of the input voltages and voltage value of each of the input voltages, and output the voltage value for the voltage transformation as a control signal to the non-isolation voltage transformation circuit 40.

The number of control signals outputted from the detection circuit 30 to the non-isolation voltage transformation circuit 40 is the same as the number of the input voltages. In the present disclosure, as shown in FIG. 3, when the number of the input voltage is N, the number of control signals outputted from the detection circuit 30 to the non-isolation voltage transformation circuit 40 is N, control signal input ends are 11, 12, . . . , 1N, and the input voltage input ends of the non-isolation voltage transformation circuit 40 are 21, 22, . . . , 2N.

The non-isolation voltage transformation circuit 40 has N inputs and N outputs, and is configured to perform non-isolation voltage transformation processing on the each of the input voltages according to the control signal, adjust the voltage value of the each of the input voltages to the voltage value for the voltage transformation, and output the input voltage subjected to the non-isolation voltage transformation processing to the series voltage circuit 10.

The series voltage circuit 10 has N inputs and one output, and is configured to connect serially the input voltage subjected to the non-isolation voltage transformation processing, to obtain an input voltage usable for isolation voltage transformation, and output the serially connected input voltage to the adjustable voltage DC/DC isolation circuit 20.

The adjustable voltage DC/DC isolation circuit 20 has one input and one output, and is configured to perform isolation voltage transformation on the serially connected input voltages according to the rated power of the electric load, and output the input voltages subjected to the isolation voltage transformation to the electric load.

In this embodiment, the input voltage is transformed before the input voltage is connected serially, so that the input voltage of the series voltage circuit 10 is within an appropriate range.

Figure 4:
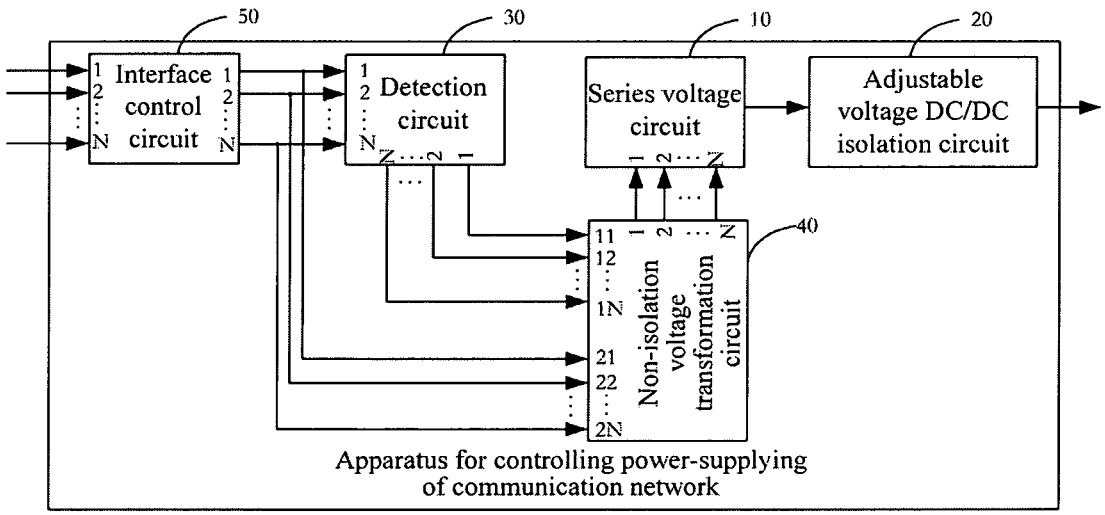
FIG. 4 is a schematic block diagram of a third embodiment of the apparatus for controlling power-supplying of the communication network according to the present disclosure.

FIG. 4 is a schematic block diagram of a third embodiment of the apparatus for controlling power-supplying of the communication network according to the present disclosure. In this embodiment, the apparatus for controlling power-supplying of the communication network includes the series voltage circuit 10, the adjustable voltage DC/DC isolation circuit 20, the detection circuit 30, the non-isolation voltage transformation circuit 40, and an interface control circuit 50.

The interface control circuit 50 has N inputs and N outputs, wherein an output end of the interface control circuit 50 is connected to an input end of the detection circuit 30 and an input end of the non-isolation voltage transformation circuit 40, the interface control circuit 50 is configured to filter the input voltage and control the number of the input voltages.

The detection circuit 30 has N inputs and N outputs, and is configured to determine the number of filtered input voltages, calculate the voltage value for the voltage transformation according to the number of the input voltages and a voltage value of each of the filtered input voltages, and output the voltage value for the voltage transformation as a control signal to the non-isolation voltage transformation circuit 40.

The non-isolation voltage transformation circuit 40 has N inputs and N outputs, and is configured to perform non-isolation voltage transformation processing on the each of the filtered input voltages according to the control signal, adjust the voltage value of the each of the input voltages to the voltage value for the voltage transformation, and output the input voltage subjected to the non-isolation voltage transformation processing to the series voltage circuit 10.

The series voltage circuit 10 has N inputs and one output, and is configured to connect serially the input voltage subjected to the non-isolation voltage transformation processing, to obtain an input voltage usable for isolation voltage transformation, and the input voltage is outputted to the adjustable voltage DC/DC isolation circuit 20.

The adjustable voltage DC/DC isolation circuit 20 has one input and one output, and is configured to perform isolation voltage transformation on the serially connected input voltages according to the rated power of the electric load, and output the input voltages subjected to the isolation voltage transformation to the electric load.

Figure 5:
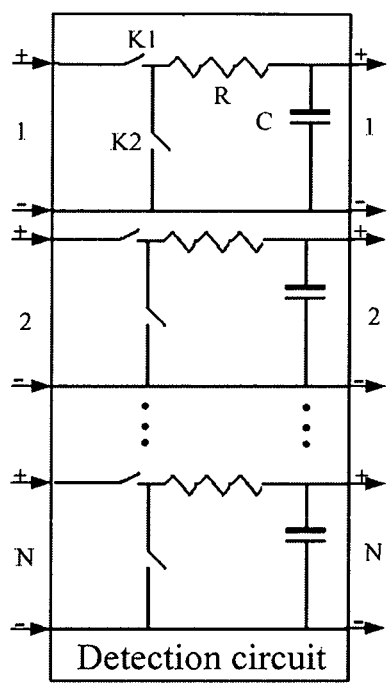
FIG. 5 is a schematic diagram of an alternative embodiment of a detection circuit of the present disclosure.

FIG. 5 is a schematic diagram of an alternative embodiment of the detection circuit of the present disclosure. In this embodiment, the detection circuit 10 includes N input-andoutput sub-circuits, each of the input-and-output sub-circuits includes a first switch K1, a second switch K2, a resistor R and a capacitor C. A stationary end of the first switch K1 is connected to a movable end of the second switch K2 and a first end of the resistor R. A second end of the resistor R is connected to a first end of the capacitor C. A second end of the capacitor C is connected to a stationary end of the second switch K2. A movable end of the first switch is connected to an anode of the input end of the detection circuit. The stationary end of the second switch is connected to a cathode of the input end of the detection circuit. A first end of the capacitor is connected to an anode of an output end of the detection circuit. The second end of the capacitor is connected to a cathode of the output end of the detection circuit.

Figure 6:
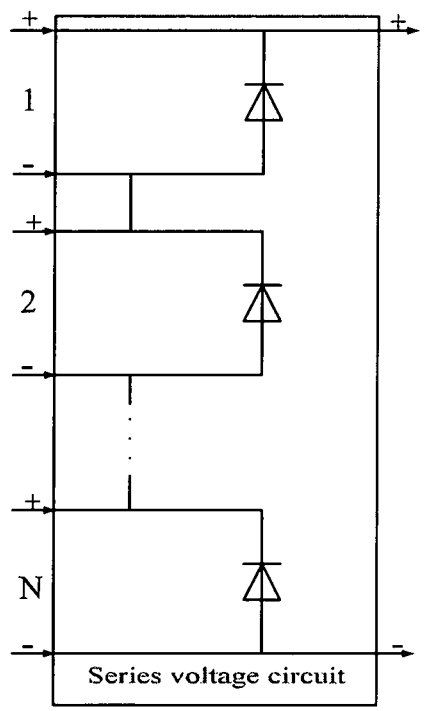
FIG. 6 is a schematic diagram of an alternative embodiment of a series voltage circuit of the present disclosure.

FIG. 6 is a schematic diagram of an alternative embodiment of the series voltage circuit of the present disclosure. In this embodiment, the series voltage circuit 10 includes N diodes connected in series, each of the diodes is connected in parallel with two input ends of one of the N inputs of the series voltage circuit, to provide a freewheeling path.

The series voltage circuit 10 connects serially the output voltages of the non-isolation voltage transformation circuits 40. In order to avoid affecting the normal operation of the apparatus for controlling power-supplying when the one of the outputs of the non-isolation voltage transformation circuit 40 is invalid, in this embodiment, a diode is connected in parallel with each of input ends of the series voltage circuit 10 to provide a freewheeling path.

Figure 7:
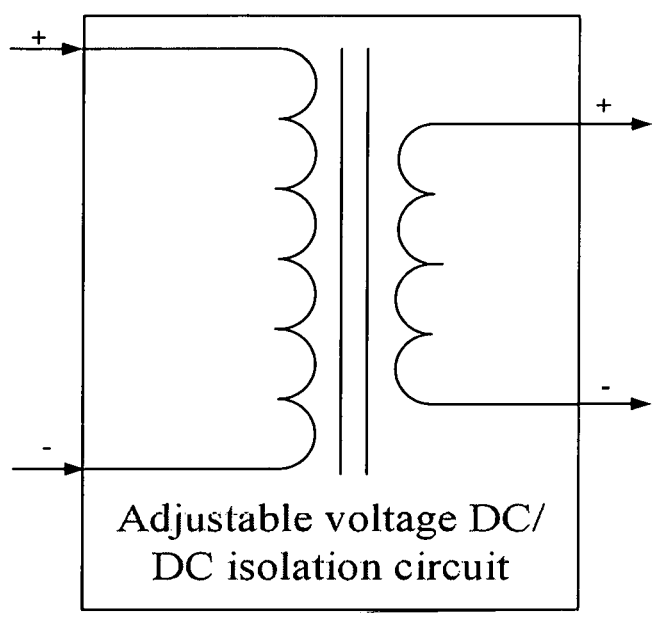
FIG. 7 is a schematic diagram of an alternative embodiment of an adjustable voltage DC/DC isolation circuit of the present disclosure.

FIG. 7 is a schematic diagram of an alternative embodiment of the adjustable voltage DC/DC isolation circuit of the present disclosure. In this embodiment, the adjustable voltage DC/DC isolation circuit 20 is an adjustable low frequency transformer.

The above apparatus for controlling power-supplying according to the present disclosure may be a separate apparatus, as shown in FIG. 2, FIG. 3 or FIG. 4, or may be integrated on an electric load as a chip or a modular circuit.

According to the embodiments of the present disclosure, the number of the circuits usable for supplying power can be determined in the case that multiple circuits are used to supply power, the voltage value of the non-isolation voltage transformation can be determined according to the number of the circuits usable for supplying power, and the input voltages subjected to the voltage transformation are connected serially, so that the current averaging is realized without using a current averaging circuit, thereby realizing the fairness of power-supplying at the power supplying end. Furthermore, an adjustable voltage DC/DC isolation circuit can be used in order to obtain the voltage required for the electric load through isolation voltage transformation, thereby reducing the DC/DC isolation circuit, reducing cost and volume of the apparatus for controlling power-supplying, improving the conversion effect of the apparatus for controlling power-supplying, and reducing the consumption of heat energy.

INDUSTRIAL APPLICABILITY

The method and the apparatus for controlling power-supplying of the communication network provided by the present disclosure can improve the conversion efficiency of the current averaging, reduce the consumption of heat energy, reduce the number of components in the power supply circuit, and reduce the cost.

What is claimed is:

1. A method for controlling power-supplying of a communication network, comprising:
connecting serially at least two input voltages before supplying power to an electric load; and
performing isolation voltage transformation processing on the serially connected input voltages according to rated power of the electric load, to obtain a voltage required for the electric load;
wherein before connecting serially the at least two input voltages, the method further comprises:
determining the number of the at least two input voltages;
calculating a voltage value for a voltage transformation according to the number of the at least two input voltages and a voltage value of each of the at least two input voltages; and
performing non-isolation voltage transformation processing on the each of the at least two input voltages according to the voltage value for the voltage transformation;
wherein, connecting serially the at least two the input voltages comprises: connecting serially the at least two input voltages subjected to the non-isolation voltage transformation.

2. The method according to claim 1, wherein calculating the voltage value for the voltage transformation comprises:
determining, according to the number of the at least two input voltages, the voltage value of the each of the at least two input voltages after voltage reduction, so that the voltage value of the serially connected input voltages is kept substantially constant.

3. An apparatus for controlling power-supplying of a communication network, comprising a series voltage circuit having N inputs and one output, and an adjustable voltage DC/DC isolation circuit having one input and one output; wherein
the series voltage circuit is configured to connect serially at least two input voltages before supplying power to an electric load, and output the serially connected input voltages to the adjustable voltage DC/DC isolation circuit; and
the adjustable voltage DC/DC isolation circuit is configured to perform isolation voltage transformation on the serially connected input voltages according to rated power of the electric load, to obtain a voltage required for the electric load, and output to the electric load the input voltages subjected to the isolation voltage transformation, wherein the N is an integer greater than or equal to 2;
wherein the apparatus further comprises: a detection circuit having N inputs and N outputs, and a non-isolation voltage transformation circuit having N inputs and N outputs, wherein
the detection circuit is configured to determine the number of the at least two input voltages, calculate a voltage value for a voltage transformation according to the number of the at least two input voltages and a voltage value of each of the at least two input voltages, and output the voltage value for the voltage transformation as a control signal to the non-isolation voltage transformation circuit;
the non-isolation voltage transformation circuit is configured to perform non-isolation voltage transformation processing on the each of the at least two input voltages according to the control signal, and output to the series voltage circuit the input voltage subjected to the non-isolation voltage transformation processing; and
the series voltage circuit is configured to connect serially the at least two input voltages subjected to the non-isolation voltage transformation processing.

4. The apparatus according to claim 3, further comprising: an interface control circuit having N inputs and N outputs, wherein an output end of the interface control circuit is connected to an input end of the detection circuit and an input end of the non-isolation voltage transformation circuit, the interface control circuit is configured to filter the input voltage and control the number of the at least two input voltages.

5. The apparatus according to claim 3, wherein the detection circuit comprises N input-and-output sub-circuits, each of the input-and-output sub-circuits comprises a first switch, a second switch, a resistor and a capacitor, and a stationary end of the first switch is connected to a movable end of the second switch and a first end of the resistor, a second end of the resistor is connected to a first end of the capacitor, and a second end of the capacitor is connected to a stationary end of the second switch, a movable end of the first switch is connected to an anode of an input end of the detection circuit, and the stationary end of the second switch is connected to a cathode of the input end of the detection circuit, a first end of the capacitor is connected to an anode of an output end of the detection circuit, and the second end of the capacitor is connected to a cathode of the output end of the detection circuit.

6. The apparatus according to claim 3, wherein the series voltage circuit comprises N diodes connected in series, each of the diodes is connected in parallel with two input ends of one of the N inputs of the series voltage circuit, to provide a freewheeling path.

7. The apparatus according to claim 3, wherein the adjustable voltage DC/DC isolation circuit is an adjustable low frequency transformer.

8. The apparatus according to claim 3, wherein the apparatus is integrated on the electric load as at least one of a chip or a modular circuit.

* * * * *